United States Patent
Wei

(10) Patent No.: US 9,778,472 B2
(45) Date of Patent: Oct. 3, 2017

(54) STEREOSCOPIC DISPLAY DEVICE

(71) Applicant: BOE TECHNOLOGY GROUP CO., LTD., Beijing (CN)

(72) Inventor: Wei Wei, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 300 days.

(21) Appl. No.: 14/762,631

(22) PCT Filed: Dec. 17, 2014

(86) PCT No.: PCT/CN2014/094054
§ 371 (c)(1),
(2) Date: Jul. 22, 2015

(87) PCT Pub. No.: WO2016/037434
PCT Pub. Date: Mar. 17, 2016

(65) Prior Publication Data
US 2016/0252738 A1 Sep. 1, 2016

(30) Foreign Application Priority Data
Sep. 12, 2014 (CN) .......................... 2014 1 0466831

(51) Int. Cl.
*G02B 27/22* (2006.01)
*G02B 3/00* (2006.01)

(52) U.S. Cl.
CPC .......... *G02B 27/2214* (2013.01); *G02B 3/00* (2013.01); *G02B 3/0037* (2013.01); *G02B 2003/0093* (2013.01)

(58) Field of Classification Search
CPC .. G02B 27/2214; G02B 3/005; G02B 3/0062; G02B 2003/0093; G02B 27/22;
(Continued)

(56) References Cited

U.S. PATENT DOCUMENTS 5,966,167 A * 10/1999 Nose .................. G02B 27/0093
348/169
7,580,186 B2 8/2009 Mather et al.
(Continued)

FOREIGN PATENT DOCUMENTS

CN    1591088 A    3/2005
CN  101000406 A    7/2007
(Continued)

OTHER PUBLICATIONS

Korean Office Action in Korean Application No. 10-2015-7025845 dated Feb. 24, 2017 with English translation.
(Continued)

*Primary Examiner* — Bumsuk Won
*Assistant Examiner* — Balram Parbadia
(74) *Attorney, Agent, or Firm* — Collard & Roe, P.C.

(57) ABSTRACT

A stereoscopic display device is provided. The stereoscopic display device comprises: a display panel (100), comprising a plurality of first display units (101) and a plurality of second display units (102) which are alternately arranged; and a grating (200) positioned on a light exiting side of the display panel (100) and including a plurality of light-transmitting regions (a) and a plurality of light-shielding regions (b), wherein the stereoscopic display device comprises a lens (300) with a light divergence action at a position corresponding to each of the light-transmitting regions (a) of the grating (200). Therefore, when the stereoscopic display device is viewed at a short distance, a mechanical performance of the stereoscopic display device is improved.

18 Claims, 2 Drawing Sheets

(58) Field of Classification Search
CPC .... G02B 3/00; G02B 3/0037; H04N 13/0404; H04N 13/0411; H04N 2013/0465; H04N 13/0018; H04N 13/0022; H04N 13/0033; H04N 13/0406; H04N 13/0409; H04N 13/045

See application file for complete search history.

(56) References Cited

U.S. PATENT DOCUMENTS

| | | | |
|---|---|---|---|
| 9,223,141 | B2 | 12/2015 | Hamagishi et al. |
| 2004/0169831 | A1* | 9/2004 | Uehara ............. G02F 1/133526 353/122 |
| 2013/0050452 | A1 | 2/2013 | Ramsey et al. |
| 2013/0120543 | A1 | 5/2013 | Chen et al. |
| 2014/0118824 | A1 | 5/2014 | Hsieh et al. |
| 2015/0124316 | A1 | 5/2015 | Kim et al. |
| 2015/0153581 | A1 | 6/2015 | Wang |

FOREIGN PATENT DOCUMENTS

| | | | |
|---|---|---|---|
| CN | 201021954 Y | | 2/2008 |
| CN | 201917718 U | | 8/2011 |
| CN | 102998805 A | | 3/2013 |
| CN | 103149732 A | | 6/2013 |
| CN | 103293689 A | * 9/2013 | ......... G02B 27/2214 |
| CN | 103345068 A | | 10/2013 |
| JP | 2012-118185 A | | 6/2012 |
| KR | 10-1085587 B1 | | 11/2011 |
| KR | 10-2012-0059961 A | | 6/2012 |
| KR | 10-2014-0041102 A | | 4/2014 |

OTHER PUBLICATIONS

Chinese Office Action in Chinese Application No. 201410466831.8 dated Jan. 12, 2016 with English translation.
Lenticular lens sheet design required to realize illumination angle modulation manner stereoscopic module and analysis on crosstalk reasons, Telecommunications Technology Association, Photonics Conference (2004).
Korean Office Action in Korean Application No. 10-2015-7025845 dated Aug. 16, 2016 with English translation.
Second Chinese Office Action in Chinese Application No. 201410466831.8 dated Jun. 20, 2016 with English translation.
International Search Report of PCT/CN2014/094054 in Chinese, dated May 28, 2015 with English translation.
Notice of Transmittal of the International Search Report of PCT/CN2014/094054 in Chinese, dated May 28, 2015.
Written Opinion of the International Searching Authority of PCT/CN2014/094054 in Chinese, dated May 28, 2015 with English translation.

* cited by examiner

STEREOSCOPIC DISPLAY DEVICE

CROSS REFERENCE TO RELATED APPLICATIONS

This application is the National Stage of PCT/CN2014/094054 filed on Dec. 17, 2014, which claims priority under 35 U.S.C. §119 of Chinese Application No. 201410466831.8 filed on Sep. 12, 2014, the disclosure of which is incorporated by reference.

TECHNICAL FIELD

Embodiments of the invention relate to a stereoscopic display device.

BACKGROUND

In recent years, stereoscopic display has become a mainstream trend in a display field. The most basic principle of the stereoscopic display is that: left and right eyes of a person receive different images with parallax, then the different images are superimposed and regenerated by a brain, to form a three-dimensional stereoscopic view.

A three-dimensional display technology mainly comprises a glasses type and a naked-eye type; as no glasses need to wear, the naked-eye type three-dimensional display has attracted more and more attention. An existing naked-eye stereoscopic display device, as shown in FIG. 1, comprises a display panel 100 and a grating 200, wherein, the display panel 100 includes a plurality of first display units 101 and a plurality of second display units 102, the first display units 101 display a left-eye image, and the second display units 102 display a right-eye image; the grating 200 includes light-shielding regions and light-transmitting regions, so that the grating has a light splitting function, to enable a left eye to only see the left-eye image and a right eye to only see the right-eye image, so as to generate a stereoscopic feeling.

As shown in FIG. 1, an interval e between the left eye and the right eye of the person is generally about 65 mm, a viewing distance between the left and right eyes and the grating is H, a distance between the grating and the display units is f, and a pitch of two adjacent display units is p. With reference to FIG. 1, ΔABC and ΔAED are similar, then p:e=f:H; moreover, after the display panel is formed, the pitch p of two adjacent display units is a fixed value, and the interval e between the left and right eyes is a fixed value, so the distance f between the grating and the display units is proportional to the viewing distance H between the left and right eyes and the grating, namely, the smaller the distance f between the grating and the display units, the smaller the viewing distance H between the left and right eyes and the grating. For mobile display devices such as a mobile phone and a tablet computer, in order to make products lighter and thinner and achieve a short distance viewing, the distance f between the grating and the display units is smaller generally, and is basically equal to a thickness of a glass substrate on a light exiting side of the display panel, namely, about 0.2 mm, which results in frangibility of such products, unstable mechanical properties such as impact resistance and poor product safety. But if the distance between the grating and the display units is increased, although the mechanical performance of the display device is improved, the viewing distance between the left and right eyes and the grating is increased as well, which is unfavorable for obtaining a 3D display effect at a short distance.

SUMMARY OF THE INVENTION

Embodiments of the invention provide a stereoscopic display device, and the stereoscopic display device not only has an excellent mechanical performance but also can guarantee a 3D display effect obtained at a short distance.

The embodiments of the invention provide a stereoscopic display device, comprising: a display panel, comprising a plurality of first display units and a plurality of second display units which are alternately arranged; a grating, disposed on a light exiting side of the display panel and comprising a plurality of light-transmitting regions and a plurality of light-shielding regions, wherein the display device comprises a lens with a light divergence action at a position corresponding to each of the light-transmitting regions of the grating.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE EMBODIMENTS

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 2:
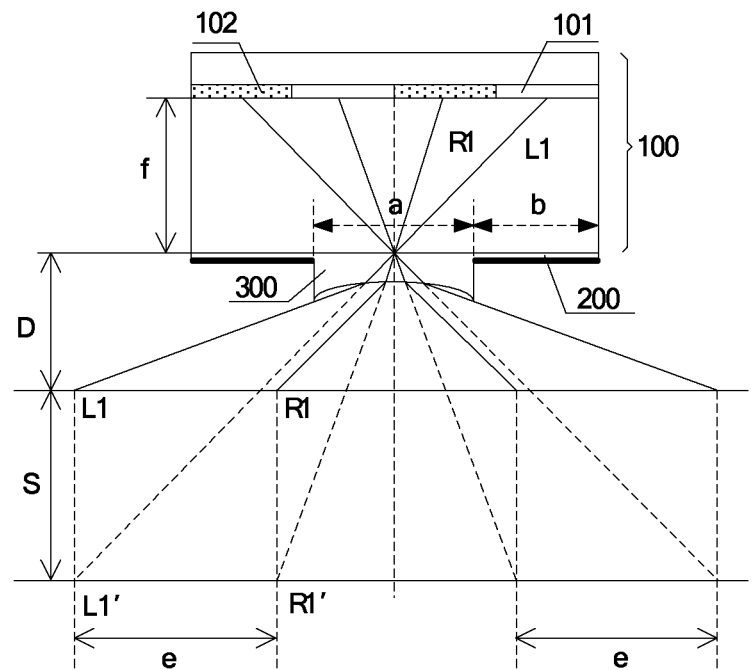
FIG. 2 is a schematic structural diagram of a stereoscopic display device provided by an embodiment of the invention.

An embodiment of the invention provides a stereoscopic display device, as shown in FIG. 2, comprising a display panel 100 and a grating 200 disposed on a light exiting side of the display panel 100, wherein, the display panel 100 includes a plurality of first display units 101 and a plurality of second display units 102 which are alternately arranged, the first display units 101 display a left-eye image and the second display units 102 display a right-eye image; the grating 200 includes light-transmitting regions a and light-shielding regions b, wherein the display device comprises a lens 300 with a light divergence action at a position corresponding to the light-transmitting region a of the grating 200, after light of the first display units 101 and the second display units is deflected by the lens 300, the left eye receives the left-eye image, and the right eye receives the right-eye image. The display device comprises a lens with the light divergence action at a position corresponding to the light-transmitting region a of the grating, and it may be that one lens with the light divergence action is arranged at a position corresponding to each of the light-transmitting regions of the grating, or one lens corresponds to a plurality of light-transmitting regions, and then, after light passing through the light-transmitting regions is deflected by the lens, the left eye receives the left-eye image, and the right eye receives the right-eye image.

Exemplarily, as shown in FIG. 2, light emitted by the first display units 101 of the display device is L1 and light emitted by the second display units 102 of the display device is R1. In a case that the display device is not added with a lens, a light path of the light L1 emitted by the first display units 101 and that of the light R1 emitted by the second display units 102 are shown by dotted lines; at a position away from the grating 200 by S+D, an interval between L1' and R1' is equal to the interval between the right and left eyes, namely, at the position away from the grating 200 by S+D, the left eye receives the left-eye image, and the right eye receives the right-eye image, and a viewer sees a 3D image. The light path of the light L1 emitted by the first display units 101 and that of the light R1 emitted by the second display units 102 after being deflected by the lens 300 are shown by solid lines, at the position away from the grating 200 by a distance D after deflection by the lens 300, the interval between the L1 and R1 is equal to the interval between the right and left eyes, in other words, at the position away from the grating 200 by the distance D, the left eye receives the left-eye image, and the right eye receives the right-eye image, and a viewer sees a 3D image. In this way, by arranging the lens with the divergence action, a viewing position of the 3D image is closer to the grating.

Figures 3A, 3B:
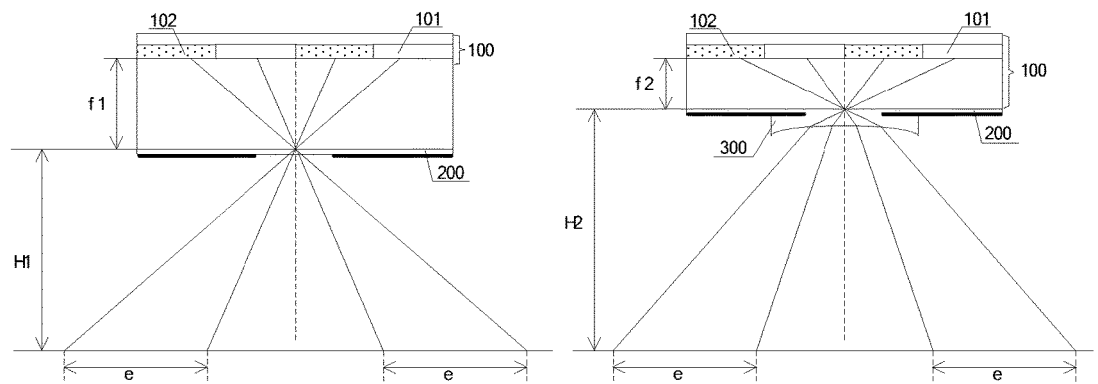
FIG. 3(a) and FIG. 3(b) are effect comparison schematic diagrams of the stereoscopic display device provided by the embodiment of the invention and the existing stereoscopic display device.

As the distance f between the grating and the display units is proportional to the viewing distance H between the left and right eyes and the grating, the smaller the distance between the grating and the display units, the smaller the viewing distance H between the left and right eyes and the grating, then while the distance between the grating and the display units is increased, the display device may be provided with the lens with the light divergence action in the light-transmitting regions of the grating, so that a 3D image can be viewed at a position of the original viewing distance. As shown in FIG. 3, in FIG. 3(a), the distance between the grating and the display units is f1, the viewing distance between the left and right eyes and the grating is H1, and the left-eye image displayed by the first display units 101 and the right-eye image displayed by the display units 102 are respectively received by the left eye and the right eye at a position of H1. In FIG. 3(b), the distance between the grating and the display units is f2, and f1>f2, the viewing distance between the left and right eyes and the grating is H2, and the left image displayed by the first display units 101 and the right image displayed by the second display units 102 are respectively received by the left eye and the right eye at a position of H2. As the display device in FIG. 3(b) further comprises a lens 300 with a light divergence action, after being deflected by the lens 300, the left-eye image displayed by the first display units 101 and the right-eye image displayed by the second display units 102 are respectively received by the left eye and right eye at the position of H2, and H1+f1=H2+f2 can be achieved. In this way, under the condition of better mechanical performance of the display device (a display panel is thicker), the 3D image can be viewed at a short distance.

Figure 1:
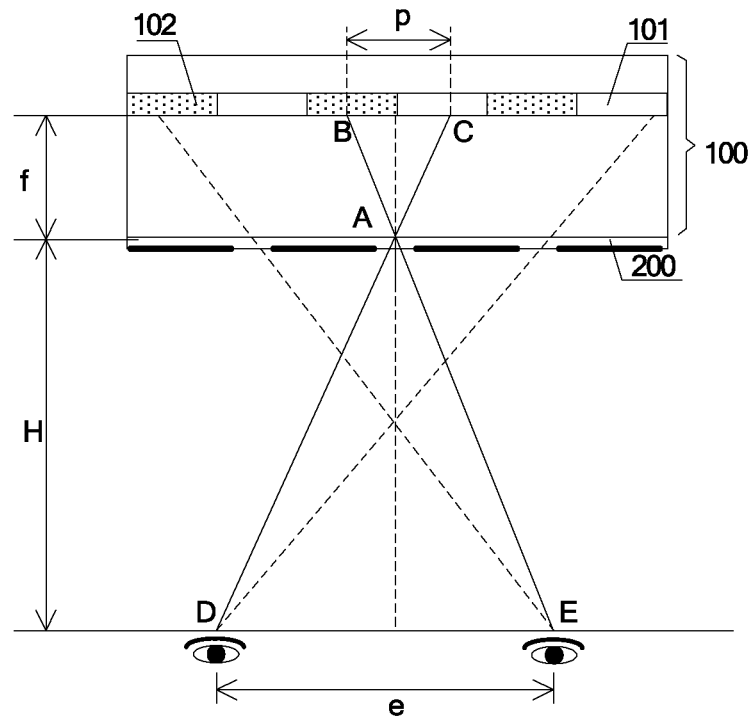
FIG. 1 is a schematic diagram of an existing stereoscopic display device.

It should be explained that light passing through the lens with the light divergence action can be diverged. The lens may be the lens 300 as shown in FIG. 2 or may be a prism and the like, as long as it can diverge light, which is not limited by embodiments of the invention, and embodiments of the invention only take what is shown in FIG. 2 as an example for detailed description. In addition, as shown in FIG. 2, the display panel 100 includes a plurality of first display units 101 and a plurality of second display units 102, and in transverse and longitudinal directions of the display panel 100 (only in transverse direction in FIG. 1) the first display units 101 and the second display units 102 may be alternately arranged.

An embodiment of the invention provides a stereoscopic display device, comprising a display panel, a grating and a lens disposed at a position corresponding to each of the light-transmitting regions of the grating, compared with a case without the lens, after light of the first display units and the second display units is refracted by the lens, the left eye receives a left-eye image and the right eye receives a right-eye image at a nearer position, and the display device can realize that the 3D image can be viewed at a shorter distance by using the lens with the light divergence action under the condition of better mechanical performance of the display panel (the display panel is thicker).

Exemplarily, the mechanical performance of the display panel can be increased by increasing a thickness of a glass substrate on a light exiting side of the display panel; or the mechanical performance of the display panel can also be increased by adding a spacer glass between the glass substrate and the grating.

Alternatively, the display device is provided with a lens with a light divergence action at a position corresponding to each of light-transmitting region of the grating, a plurality of lenses corresponding to a plurality of light-transmitting regions have the same divergence effect; in other words, each lens is in a same shape, and has a same light deflecting degree. Of course, two or more adjacent light-transmitting regions correspond to one lens, but the lens has the same light divergence effect at each of the positions corresponding to the two or more light-transmitting regions, for example, a curvature is consistent, thus ensuring the same light deflection in each of the light-transmitting regions; and in the embodiment of the invention, the case that one lens corresponds to one light-transmitting region is taken as an example for detailed description.

Exemplarily, the lens with the light divergence action is disposed on a light exiting side of the grating. Of course, the lens with the light divergence action may also be disposed between the grating and the display panel; and when the lens is disposed between the grating and the display panel, transparent adhesive may be filled between the grating and the display panel to favorably fix the lens and the grating. In the embodiments and the drawings of the invention, the case that the lens with the light divergence action is disposed on a light exiting side of the grating is taken as an example for detailed description.

Alternatively, as shown in FIG. 2, the lens with the light divergence action is plano concave lens or triangular prism. Further, as shown in FIG. 2, the lens 300 with the light divergence action has a flat surface on a light incident side thereof and has a concave surface on a light exiting side thereof.

Figure 4:
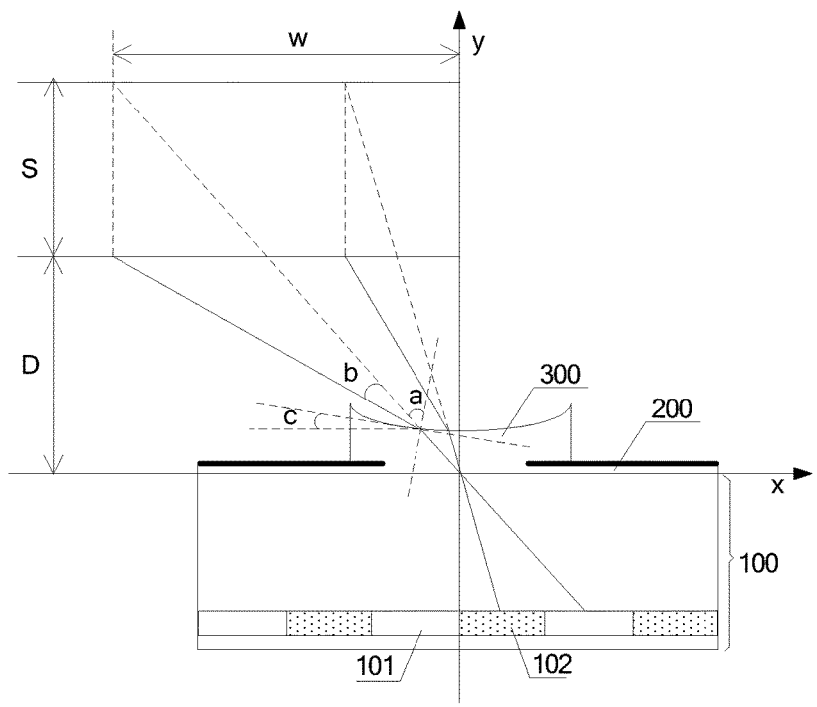
FIG. 4 is a light path analysis diagram of the stereoscopic display device provided by the embodiment of the invention.

Alternatively, as shown in FIG. 4, an optical axis of the plano concave lens (namely, the lens 300) passes through a center point of a light-transmitting region, by taking the center point of the light-transmitting region as a coordinate origin (0, 0), an x axis being parallel with the grating, and a y axis being perpendicular to the grating, any point (x, y) on a concave surface of each lens with the light divergence action meets conditions of:

$$n\sin a = \sin(a+b);$$

$$\tan(90° - a + c) = \frac{D+S-y}{w-x};$$

$$\tan(90° - a - b + c) = \frac{D-y}{w-x};$$

$$\frac{(D+S-y)\sin(90° - a - b + c)}{(D-y)\sin(90° - a + c)} = \frac{\sin(a+b-c)}{\sin(a-c)};$$

where, x is an x coordinate corresponding to any point on the concave surface, y is a y coordinate corresponding to any point on the concave surface, n is a refractive index of the lens, a is an incident angle, b is a difference between an incident angle and a refractive angle, c is an included angle between a tangential line of any point on the concave surface and x axis at a refracted light side, w is a maximal distance between the left and right eyes and the optical axis of the lens when the left and right eyes are located on one side of the optical axis of the concave lens, D is a distance between a design position and the grating, S+D is a distance between a first position and the grating, wherein, the first position is the design position of the display panel without the lens. The design position is an optimal position for obtaining a 3D image. In addition, in the embodiments of the invention, the case that the 3D image is obtained at the optimal position is taken as an example.

When the lens meets the above conditions, as shown in FIG. 2, light emitted by the first display units 101 of the display device is L1 and light emitted by the second display units 102 of the display device is R1. In a case that the display device is not added with the lens, the light L1 emitted by the first display units 101 and the light R1 emitted by the second display units 102 are L1' and R1' at a position away from the grating by a distance of S+D, wherein, a distance between L1' and R1' is the interval e between the left and right eyes (about 65 mm), so the left eye of an observer receives a left-eye image, and the right eye receives a right-eye image at the position away from the grating by the distance S+D; in other words, the observer views a 3D image. The light path of the light L1 emitted by the first display units 101 and that of the light R1 emitted by the second display units 102 after being deflected by the lens 300 are shown by solid lines, as shown in FIG. 2, after deflection by the lens 300, at a position away from the grating 200 by a distance D, light emitted by left-eye pixels and light emitted by right-eye pixels are L1 and R1, wherein, the distance between L1 and R1 is the interval e of the left and right eyes (about 65 mm), so the left eye of the observer receives the left-eye image, and the right eye receives the right-eye image at the position away from the grating by the distance D. In this way, the 3D image is viewed at a short distance under the condition of better mechanical performance of the display panel (the display panel is thicker).

It should be explained that the embodiments and drawings of the invention take one lens as example, and the lenses corresponding to the light-transmitting regions of the grating may refer to a design principle of the above lens.

Figure 5:
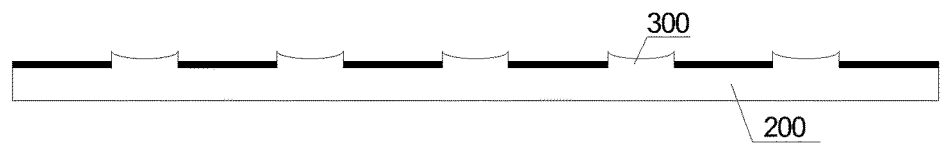
FIG. 5 is a structural schematic diagram of a grating provided by the embodiment of the invention.

Exemplarily, as shown in FIG. 5, a width of the lens 300 with the light divergence action may equal to a width of each of the light-transmitting regions. The embodiments of the invention take what is shown in the diagram as an example.

Exemplarily, as shown in FIG. 5, the grating 200 and the lenses 300 with the light divergence action are of an integral structure. In other words, the grating and the lenses with the light divergence action are of a whole structure. The lenses with the light divergence action may be formed in a manufacturing process of the grating; or the lenses with the light divergence action may also be formed on the grating after the grating is formed.

Of course, in embodiments of the invention, the grating and the lenses with the light divergence action may be not of an integral structure. For example, the lenses may be adhered to a surface of the grating by adhesive and the like, which is not limited by the embodiments of the invention.

Exemplarily, the grating and the lenses with the light divergence action may be formed by one patterning process. For example, the grating and the lenses with the light divergence action may be formed by a photolithograph process.

For example, after the grating is formed, transparent photoresist is coated on a surface of the grating, and the transparent photoresist is formed to have a surface appearance of the lenses with the light divergence action by one exposure, developing and etching.

For forming the grating and the lenses with the light divergence action by the photolithograph process, the photoresist may be formed on a glass substrate, a photoresist reserving region and a photoresist removing region are formed by one exposure and developing, a plasma dry etching is performed in the photoresist removing region, concave sphere lenses or triangular prisms are formed on a surface of the glass substrate, then black mylars are adhered to the original photoresist reserving region to make it to be light shading, so as to form a grating with the light divergence action.

For the integral structure of the grating and the lenses with the light divergence action formed by such manner, the grating and the lenses with the light divergence action are made of a same material at the same time, and are good in stability compared with those made of different materials, and the grating and the lenses are not easy to be separated.

The stereoscopic display device provided by the embodiments of the invention comprises a display panel, a grating and a lens with a light divergence action disposed at a position corresponding to a light-transmitting region of the grating, compared with a case without the lens, after light of the first display units and the second display units is refracted by the lens, the left eye receives a left-eye image and the right eye receives a right-eye image at a nearer position, and the display device can realize that the 3D image can be viewed at a shorter distance by the lens with the light divergence action under the condition of better mechanical performance of the display panel (the display panel is thicker).

The foregoing embodiments merely are exemplary embodiments of the invention, and not intended to define the scope of the invention; modification or substitution which is easily thought by any person skilled in the art within the technical scope disclosed by the invention should fall into the protection scope of the invention. Therefore, the protection scope of the invention should be the protection scope of the claims.

The application claims priority of Chinese Patent Application No. 201410466831.8 filed on Sep. 12, 2014, the disclosure of which is incorporated herein by reference in its entirety as part of the present application.

What is claimed is:

1. A stereoscopic display device, comprising
a display panel, comprising a plurality of first display units and a plurality of second display units which are alternately arranged;
a grating, disposed on a light exiting side of the display panel and comprising a plurality of light-transmitting regions and a plurality of light-shielding regions,
wherein the display device comprises a lens with a light divergence action at a position corresponding to each of the light-transmitting regions of the grating;
wherein, the lens with the light divergence action is a plano concave lens;
wherein, an optical axis of the plano concave lens passes through a center point of the corresponding light-transmitting region, by taking the center point of the light-transmitting region as a coordinate origin (0, 0), an x axis being parallel with the grating, and a y axis being perpendicular to the grating, any point (x, y) on the concave surface of the plano concave lens meets conditions of:

$n \sin a = \sin(a+b)$;

$\tan(90°-a+c) = D+S-y/w-x$;

$\tan(90°-a-b+c) = D-y/w-x$;

$(D+S-y)\sin(90°-a-b+c) = \sin(a+b-c)$;

where, x is an x coordinate of the point, y is a y coordinate of the point, n is a refractive index of the lens, a is an incident angle, b is a difference between an incident angle and a refractive angle, c is an included angle between a tangential line of the point and x axis on a refracted light side, w is a maximal distance between left and right eyes and the optical axis of the plano concave lens when the left and right eyes are located on one side of the optical axis of the plano concave lens, D is a distance between a design position and the grating, S+D is a distance between a first position and the grating, wherein, the first position is the design position of the display panel without the lens.

2. The stereoscopic display device according to claim 1, wherein, a light incident side of the plano concave lens is a flat surface and a light exiting side of the plano concave lens is a concave surface.

3. The stereoscopic display device according to claim 2, wherein, the display device comprises one lens with a light divergence action at a position corresponding to each of the light-transmitting regions of the grating, respectively.

4. The stereoscopic display device according to claim 2, wherein, the lens with the light divergence action is located on a light exiting side of the grating.

5. The stereoscopic display device according to claim 2, wherein, the lens is positioned between the grating and the display panel.

6. The stereoscopic display device according to claim 1, wherein, the display device comprises one lens with a light divergence action at a position corresponding to each of the light-transmitting regions of the grating, respectively.

7. The stereoscopic display device according to claim 1, wherein, the lens with the light divergence action is located on a light exiting side of the grating.

8. The stereoscopic display device according to claim 1, wherein, a width of the lens with the light divergence action is equal to a width of each of the light-transmitting regions.

9. The stereoscopic display device according to claim 1, wherein, the grating and the lens with the light divergence action are of an integral structure.

10. The stereoscopic display device according to claim 9, wherein, the grating and the lens with the light divergence action are formed by one patterning process.

11. The stereoscopic display device according to claim 10, wherein, the grating and the lens with the light divergence action are made of a same material.

12. The stereoscopic display device according to claim 1, wherein, the lens is positioned between the grating and the display panel.

13. The stereoscopic display device according to claim 1, wherein, the display device comprises one lens with a light divergence action at a position corresponding to each of the light-transmitting regions of the grating, respectively.

14. The stereoscopic display device according to claim 1, wherein, the display device comprises one lens with a light divergence action at a position corresponding to each of the light-transmitting regions of the grating, respectively.

15. The stereoscopic display device according to claim 1, wherein, the lens with the light divergence action is located on a light exiting side of the grating.

16. The stereoscopic display device according to claim 1, wherein, the lens with the light divergence action is located on a light exiting side of the grating.

17. The stereoscopic display device according to claim 1, wherein, the lens is positioned between the grating and the display panel.

18. The stereoscopic display device according to claim 1, wherein, the lens is positioned between the grating and the display panel.

* * * * *